No. 701,015. Patented May 27, 1902.
J. A. COWAN.
AUTOMATIC FEED FOR STRAW BURNING FURNACES.
(Application filed Dec. 17, 1900.)
(No Model.)

Witnesses
G. J. Colbourne
J. M. Webster

Inventor
J. A. Cowan
by
Ridout & Maybee
Attys

UNITED STATES PATENT OFFICE.

JOHN ALEXANDER COWAN, OF CALGARY, CANADA.

AUTOMATIC FEED FOR STRAW-BURNING FURNACES.

SPECIFICATION forming part of Letters Patent No. 701,015, dated May 27, 1902.

Application filed December 17, 1900. Serial No. 40,201. (No model.)

*To all whom it may concern:*

Be it known that I, JOHN ALEXANDER COWAN, agent, of the city of Calgary, Alberta, North-West Territories, Canada, have invented a certain new and Improved Automatic Feed for Straw-Burning Furnaces, of which the following is a specification.

The object of my invention is to devise means for feeding straw automatically and continuously to a furnace; and it consists, essentially, of a cage for straw provided with a floating apron adapted to feed the straw to one side of the cage at the bottom, of a transverse endless conveyer adapted to receive the straw from the apron and force it through a feed-box to the furnace, and of such details of construction as are hereinafter more specifically described and then definitely claimed.

Figure 1:
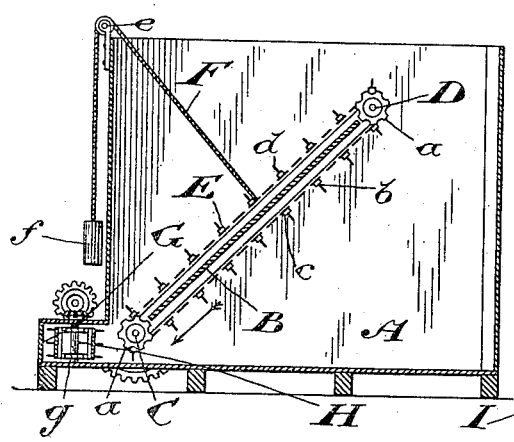
Figure 4:
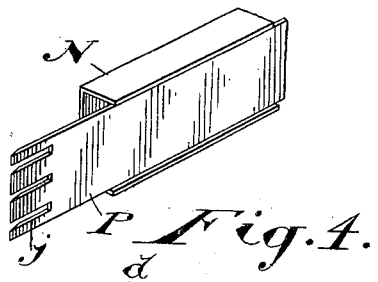
Figure 2:
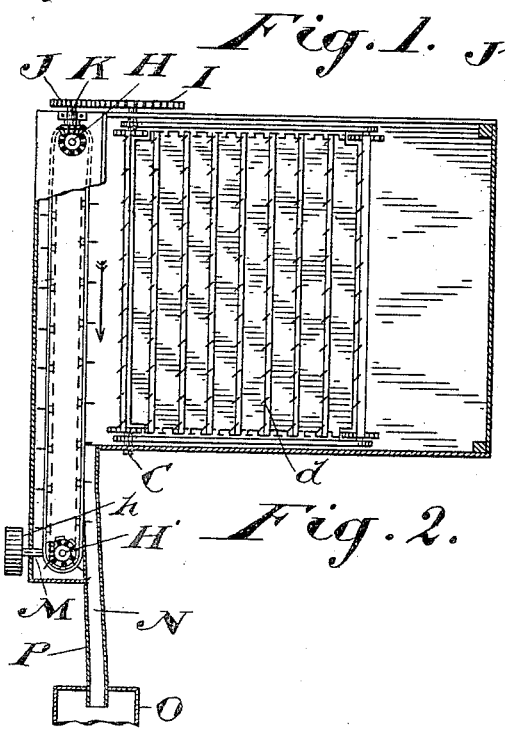
Figure 3:
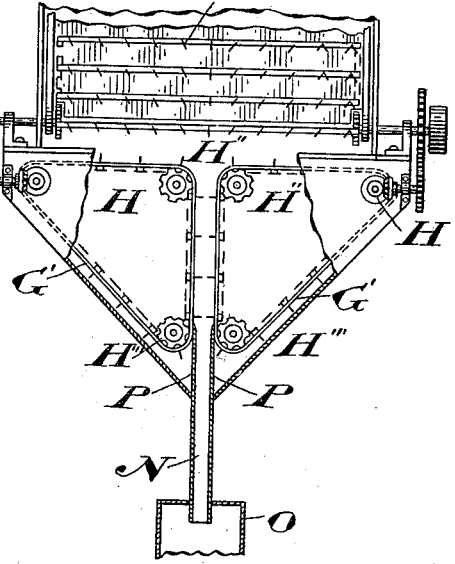

Figure 1 is a vertical cross-section of the apparatus. Fig. 2 is a sectional plan of the same. Fig. 3 is a similar view showing a modification of the transverse conveyer. Fig. 4 is a perspective detail showing the slotted tongue of the feed-box.

In the drawings like letters of reference indicate corresponding parts in the different figures.

A is the straw-cage, substantially of the shape shown and open at the top for the introduction of straw.

B is a frame journaled on the shaft C, extending through the sides of the straw-cage A. At the other end of the frame B is journaled a shaft D. On the shafts C and D are secured the sprocket-wheels $a$, upon which run the endless chains $b$. These chains are connected by slats $c$, provided with teeth $d$, preferably inclined toward one side of the cage. These slats, chains, and teeth form what I call the "feed-apron" E.

F is a cord secured at one end to the side of the frame B. This cord passes over the guide or pulley $e$, secured to the cage, and has a counterbalancing-weight $f$ secured to its other end. These parts may be duplicated at the other side of the frame, if necessary.

When starting operations, the feed-apron is drawn to a vertical position and the box filled with straw, against which the apron presses with sufficient force to give the teeth $d$ a good grip on the straw, the counterbalancing-weight preventing the pressure becoming too great.

It will be noticed that the shaft C is so placed as to cause the feed-apron to draw the straw to the lower front corner of the cage when operating, as hereinafter described.

In front of the lower end of the feed-apron is located a transverse conveyer G, consisting of teeth connected to slats secured to chains running on the sprocket-wheels $g$ on the vertical shafts H H'. These shafts are suitably journaled, and the whole conveyer is preferably cased in, as indicated, an opening of course being left between its inner face and the end of the feed-apron.

On the end of the shaft C is secured the gear-wheel I, meshing with the gear-pinion J, fast on the shaft K, suitably journaled and connected by bevel-gearing L with the shaft H, so that when the transverse conveyer moves in the direction indicated by arrow in Fig. 2 the under side of the feed-apron moves in the direction indicated by arrow in Fig. 1.

M is a short shaft suitably journaled and provided with the driving-pulley $h$, by means of which it may be driven from any suitable source of power. This shaft M is connected by bevel-gearing with the shaft H'.

N is the feed-box, preferably formed of sheet-iron and having an open end within the furnace O. The side of this feed-box next to the transverse conveyer is formed of a sheet-metal tongue P, secured toward the end nearest the furnace and free at the other end. The free end of this tongue lies against the surface of the canvas $i$, with which the slats of the transverse conveyer are covered. It is provided with slots $j$ to permit of the passage of the conveyer-teeth.

The operation of the device is substantially as follows: The straw is continuously fed to the transverse conveyer by the feed-apron E, which gradually drops to the bottom of the straw-cage as the straw is used up. The transverse conveyer carries the straw to the feed-box, into which it is forced, the tongue P stripping the conveyer of straw and preventing it being carried around the other side. The gear-wheel I being larger than the pinion J, the motion of the apron is slower than the transverse conveyer, which is necessary to insure the proper working of the apparatus, as otherwise the feed-apron would bring more straw to the conveyer than the latter could carry off to the furnace. Instead of using the single transverse conveyer a double conveyer could be used, as shown in Fig. 3, which shows the modification employed when it is desired to take the straw in a direct line from the center of the feed-apron. The teeth $d$ of the feed-apron, it will be noticed, are inclined from each side toward the center, and two transverse conveyers G' are employed, running on sprocket-wheels on the shafts H H' $H^2$ $H^3$. The shafts $H^2$ $H^3$, it will be noticed, are so arranged that a channel is formed by the conveyers leading to the feed-box N. As there are two conveyers, each side of the feed-box N is provided with a tongue P. It will be observed that the mode of operation of this modification is substantially the same as that of the form shown in Fig. 2.

The apparatus might be arranged to discharge either to the right or the left, and other modifications might also be made which would fall within the scope of my invention.

From the above description it will be seen that I have devised an apparatus by means of which straw may be automatically and continuously fed to the furnace, thus dispensing with the work of the attendant usually employed for that purpose.

What I claim as my invention is—

1. In an automatic feed for straw-burning furnaces, a box or cage for straw and an endless feed-apron suitably carried on a frame pivoted near the bottom and one side of the cage in combination with a suitably-supported transverse conveyer arranged in proximity to the outer side of the lower end of the apron; a feed-box adapted to receive straw from the transverse conveyer; and means for driving the apron and conveyer, substantially as and for the purpose specified.

2. In an automatic feed for straw-burning furnaces, a box or cage for straw and an endless feed-apron suitably carried on a frame pivoted near the bottom and one side of the cage; a cord attached at one end to the said frame; a guide or pulley on the cage; and a counterbalancing-weight to which the other end of the cord is secured, in combination with a suitably-supported transverse conveyer arranged in proximity to the outer side of the lower end of the apron; a feed-box adapted to receive straw from the transverse conveyer; and means for driving the apron and conveyer, substantially as and for the purpose specified.

3. In an automatic feed for straw-burning furnaces, a box or cage for straw, an endless feed-apron, and a frame carrying and supporting said feed-apron and pivoted near the bottom and one side of the cage, whereby said frame and its endless feed-apron may automatically swing on its pivot and drop to the bottom of the cage as the straw is used up, in combination with means contained in said box or cage for receiving the straw from the apron and conveying it to the furnace, substantially as and for the purpose specified.

4. In an automatic feed for straw-burning furnaces, a box or cage for straw, an endless feed-apron, a frame pivoted near the bottom and one side of said cage and carrying and supporting said feed-apron, a guide or pulley on the cage, a cord connected with the said frame and passing over said pulley and a counterbalancing-weight connected with the other end of said cord, in combination with means for receiving the straw from the apron and conveying it to the furnaces, substantially as and for the purpose described.

5. In an automatic feed for straw-burning furnaces, the combination of a box or cage for straw, transverse conveying means arranged in communication with the front part of the bottom of the cage, means to move straw in the cage to said conveying means and a feed-box arranged to receive straw from the said conveying means; the said conveying means forcibly pushing the straw in said feed-box, whereby the straw is compressed therein and is fed to the furnace in its compressed condition, substantially as and for the purpose specified.

6. In an automatic feed for straw-burning furnaces, the combination of a box or cage for straw; a transverse canvas-covered toothed conveyer arranged in communication with the bottom part of the cage; means to move straw in the cage to the conveyer; a feed-box arranged to receive straw from the conveyer; and a slotted tongue forming one side of the feed-box and adapted to strip the conveyer, substantially as and for the purpose specified.

7. In an automatic feed for straw-burning furnaces, a box or cage for straw; a transverse canvas-covered toothed conveyer arranged in communication with the bottom part of the cage; means to move straw in the cage to the conveyer; a feed-box arranged to receive straw from the conveyer; and a slotted spring-tongue forming one side of the feed-box and adapted to strip the conveyer, substantially as and for the purpose specified.

8. In an automatic feed for straw-burning furnaces, a box or cage for straw; and an endless feed-apron provided with slats and teeth inclined to one side, and suitably carried on a frame pivoted near the bottom and one side of the cage in combination with a transverse conveyer arranged in proximity to the outer side of the lower end of the feed-apron; a box adapted to receive straw from the transverse conveyer; and means for driving the apron and the conveyer so that the former deliver straw to the latter and the latter moves in the direction of inclination of the teeth of the apron, substantially as and for the purpose specified.

9. In an automatic feed for straw-burning furnaces, the combination of a box or cage for straw; means to move in the cage to the front part of the bottom of the cage; transverse conveyers arranged in communication with the said part of the cage and so carried as to draw straw from the said part of the cage between them; a feed-box adapted to receive straw from the conveyers; means for driving the different parts, substantially as and for the purpose specified.

Calgary, North-West Territories, December 8, 1900.

JOHN ALEXANDER COWAN.

In presence of—
T. J. CLARKY,
F. BRINEY.